Aug. 14, 1962  O. FRENZL  3,049,005
WIND TUNNELS
Filed July 21, 1959  2 Sheets-Sheet 1
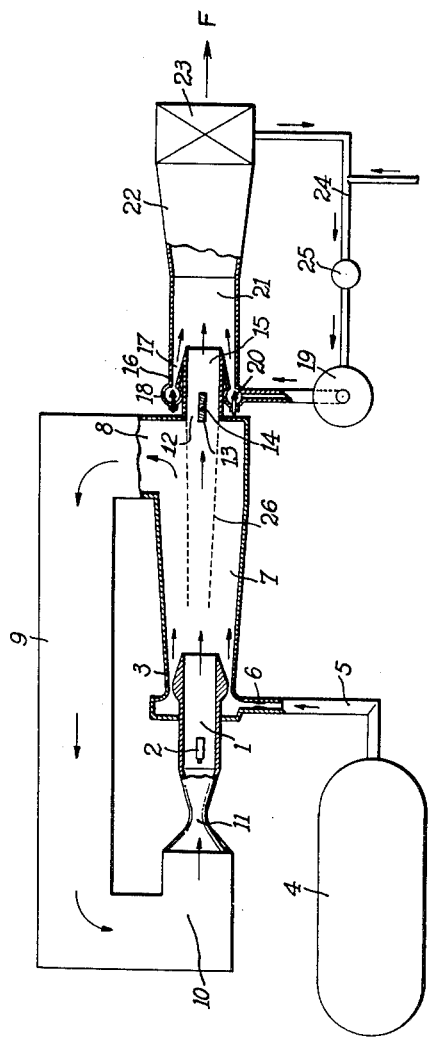
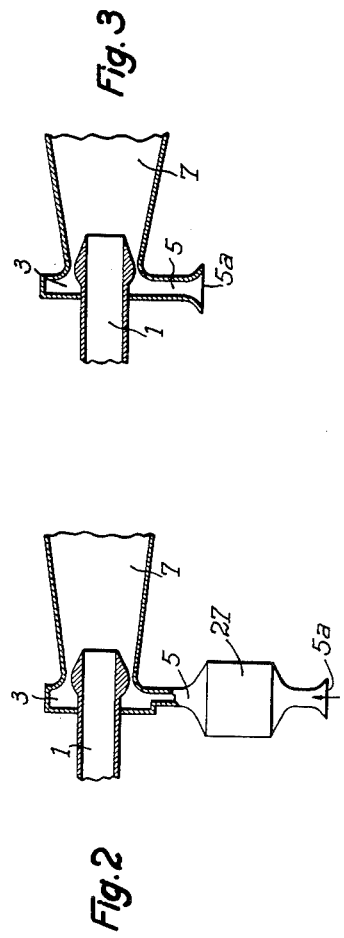
Fig. 1
Fig. 2
Fig. 3
INVENTOR
OTTO FRENZL
By
Watson, Cole, Grindle &
Watson
Attorneys Aug. 14, 1962     O. FRENZL     3,049,005
WIND TUNNELS Filed July 21, 1959     2 Sheets-Sheet 2

INVENTOR
OTTO FRENZL
By
Watson, Cole, Grindle &
Watson
Attorneys 3,049,005
WIND TUNNELS
Otto Frenzl, Dammarie-les-Lys, France, assignor to Societe Nationale d'Etude et de Construction de Moteurs d'Aviation, Paris, France, a company of France
Filed July 21, 1959, Ser. No. 828,663
Claims priority, application France July 30, 1958
6 Claims. (Cl. 73—147)

In wind tunnels which operate intermittently at subsonic or transonic speeds, a current of atmospheric air circulates through the experimental test chamber and is sucked-in through a desiccator or a heater or a cooler by means of an ejector supplied with compressed gas. At the outlet of the chamber, the mixture is directly exhausted to the exterior. The reduction of pressure in the testing chamber can in principle be obtained, irrespective of the speed, by reduction of the air intake (gating), as is the customary practice adopted in the case of test benches for altitude tests on engines.

The desiccator or the heater have a high cost price as a result of the substantial rate of flow required. A more economical solution consists in only employing in the wind-tunnel air which is derived from the source of compressed air. When this air has been passed through the ejector device, it is sent into the testing chamber and circulates a number of times in a closed circuit through an air return conduit before escaping through an orifice. Thus the quantity of compressed driving air brought in per second is less than the quantity of air which circulates per second through the testing chamber; in addition the drying of compressed air is less costly than the drying of atmospheric air. An increase of pressure in the wind tunnel can be obtained by reducing the exhaust orifice, thus giving rise to an increase in the Reynold's number. However, this results in a reduction of the working life of the wind tunnel. Moreover a reduction of pressure in the wind tunnel cannot be obtained at will.

The present invention makes it possible to obtain a variable pressure, in particular a reduction of pressure, in a wind tunnel of the air-return conduit type. By means of the invention, the running time of the wind tunnel can also be increased while nevertheless requiring less air-driving power than the power required in a wind tunnel without an air-return conduit, in which the reduction of pressure is obtained by gating the air intake.

In accordance with the invention there is arranged at the outlet orifice of a wind tunnel provided with an air-return circuit, a pump of adequate size which sucks the air or other gas from the wind-tunnel circuit on the downstream side of the main ejector of said wind-tunnel, this air or other gas which is thus sucked-in being delivered by said pump into the atmosphere.

By means of a device of this type, combustion tests or the like can also be carried out in extreme conditions of altitude, since in this case the continuous expulsion of the gases is essential.

The description which follows below with reference to the attached drawings, which are given by way of example only and not in any sense by way of limitation, will make quite clear the special features of the invention and the means by which they may be carried into effect, all the arrangements which are brought out either in the drawings or in the text being understood to fall within the scope of the present invention.

FIG. 1 shows a plan view with cross-section, of a wind tunnel with an air-return conduit combined with a pump in accordance with the invention.

FIGS. 2 and 3 are alternative forms of the air supply device of the main ejector of the wind tunnel.

Figure 4:
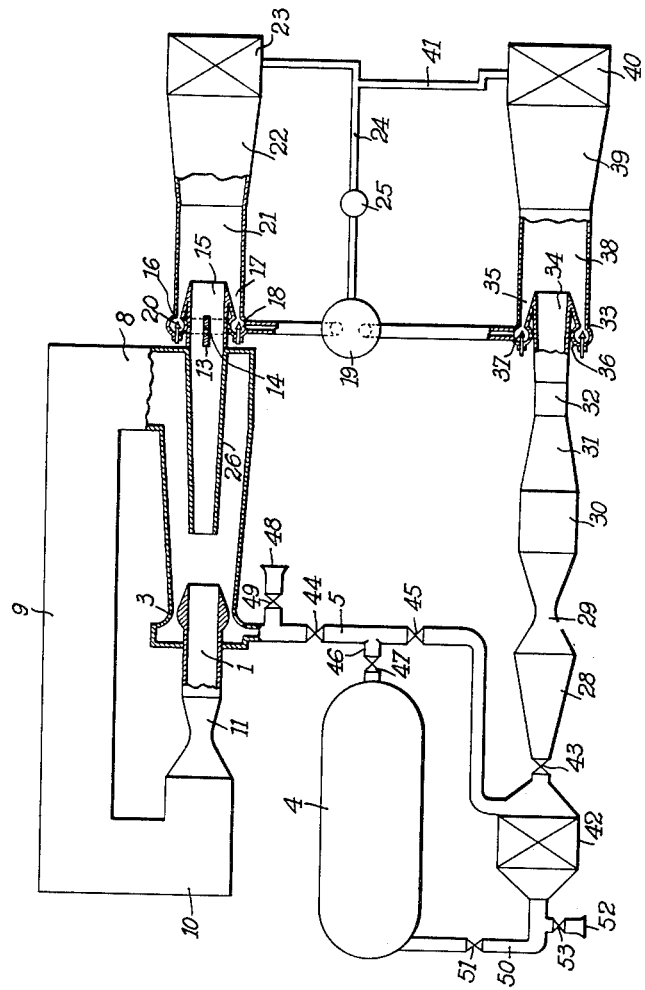
FIG. 4 is a plan view with cross-section, of two wind tunnels combined with pumps in accordance with the invention.

In FIG. 1 is shown a wind tunnel with a testing chamber 1, in which is placed a model 2 and surrounded at its extremity by an ejector 3 which forms with the external wall of the chamber 1 an annular convergent-divergent nozzle, as shown in FIG. 1. This ejector 3 could also form a number of such nozzles distributed around the axis of the said chamber. Compressed air contained in a tank 4 is admitted to the conduit 5, then passes through a restrictor 6 and is thus discharged from the ejector 3 at high speed. This high-speed air current sucks the air from the chamber 1, the mixture produced in the divergent nozzle 7 is sent back through a return conduit 8, 9, 10 into the convergent or convergent-divergent discharge nozzle 11 placed on the upstream side of the chamber 1. In the axis of the nozzle 11 and of the chamber 1, the wall of the return conduit 8 is provided with an opening 12 which may be closed by means of a butterfly valve 13 pivoting about an axis 14.

In accordance with the invention, a discharge nozzle 15 is arranged on the exterior of the conduit 8. This nozzle 15 forms part of a pump 16 which can usefully be of the hot-water type which operates intermittently as described in French Patent No. 1,104,097 of June 27, 1954. The air is driven at high speed through the nozzle 15 by means of this pump comprising a number of discharge nozzles 17 distributed around the axis of the nozzle 15, as shown in cross-section in FIG. 1. This pump could also comprise one annular nozzle only. The nozzles 17 are supplied through a common collector 18 with hot water under pressure derived from a hot-water accumulator 19. Each nozzle 17 is provided with movable needle valve 20 by means of which the section of the passage provided for the water in the nozzle can be caused to vary. One portion of the hot-water is vaporized, the greater portion remains liquid in the form of a fine spray; and there emerges from the nozzles 17 a jet of steam and water spray which sucks in the air coming from the discharge nozzle 15. At the outlet of the nozzle 15, the air is stirred up in a mixing conduit 21. The flow is slowed down in a diffuser 22 and passes through the hot water collector 23, the water being conveyed from the latter through a piping system 24 to the supply pump 25 which returns the water to the accumulator 19.

When the wind tunnel is employed for combustion tests or the like, the combustion gases are eliminated through the conduit 26 shown in a dotted line in the drawing.

When the wind tunnel is used in steady state operation, the air-flow which is sucked by the pump 16 and delivered into the atmosphere, as shown by the arrow F, is substantially equal to the flow of air derived from the reservoir-tank 4 and introduced into the wind tunnel by the convergent-divergent nozzles of the ejector 3. Thus the wind tunnel in accordance with the invention, in which a pump 16 is associated with the ejector 3 provides a means of aspirating the fluid from the wind tunnel in a steady state manner and the amount of flow-inducing air admitted is relatively small as compared with the quantity of air induced. The ejector 3 has the advantage of introducing into the wind tunnel air which already has a certain energy and assists the blowing. The driving ejector for the entrainment of air in the wind tunnel can be assisted when so required by known means, for example a fan located in the circuit 8, 9, 10.

In the form of embodiment of FIG. 1, the pump 16 only supplies a portion of the air-driving power in the interior of the wind tunnel; it can be appreciated that in certain cases, this pump 16 is capable of supplying the total driving power, the compressed air tank 4 thus having no further function.

In FIG. 2 is shown a form of embodiment which is suitable in the case of a transonic flow at low pressure in the testing chamber 1. The atmospheric air, sucked-in through the ejector 16, passes into the conduit 5 through an air-intake 5a, passes through a dryer or a heater 27 of relatively small size and flows towards the ejector 3.

An even simpler form of embodiment is shown in FIG. 3 and is suitable for a subsonic flow at low pressure in the testing chamber 1. The atmospheric air passes into the conduit 5 through the air-intake 5a and flows directly into the ejector 3.

In these two examples, the power of the pump 16 is sufficient to ensure the entire propulsion of the air in the interior of the wind tunnel, and the quantity of air sucked by the pump is equal to the quantity of atmospheric air which passes through the air-intake 5a.

FIG. 4 shows an installation provided with two wind tunnels. At the upper portion of the diagram is shown a wind tunnel for transonic and subsonic flow with air-return conduit of the type previously described and the same members have the same references. At the lower portion is shown a supersonic wind tunnel comprising a divergent chamber 28, a convergent-divergent nozzle 29, a testing chamber 30, a convergent chamber 31 with a straight extended portion 32 connected to a hot water pump 33. The pump 33 is constituted by a discharge-nozzle 34, several nozzles 35, as shown in cross-section in FIG. 4 (or only one annular nozzle), a collector 36 provided with regulating needle-valves 37 and supplied with hot water derived from the accumulator 19. The pump circuit additionally comprises a mixer 38, a diffuser 39 and a hot water collector 40, the water being brought back from this latter through a piping system 41 towards the supply pump 25.

The conduit 5 which opens at one extremity into the collector of the ejector 3 and at the other extremity between an air heater 42 and the inlet valve 43 of the divergent chamber 28, is provided with two gate valves 44 and 45 located on each side of the coupling 46 comprising the valve 47, together with the reservoir 4. An air-intake 48 fitted with a valve 49 is provided on the conduit 5 between the valve 44 and the ejector 3. A conduit 50 provided with a valve 51 connects the reservoir 4 to the inlet of the air heater 42. An air-intake 52 with a valve 53 is coupled to the conduit 50 before the inlet of the air heater 42.

The two wind tunnels are capable of operating together or separately, the air being driven either partly or wholly in each wind tunnel by means of the hot water pumps 16 or 33.

The air supplying the ejector 3 of the first wind tunnel of the air-return type can be obtained:

(a) Directly from the atmosphere through the air-intake 48, the valve 49 being open and the valve 44 being closed;

(b) From the atmosphere through the air-intake 52, passing through the heater 42. In this case, the valves 53, 45 and 44 are open whilst the valves 49, 47, 43, 51 are closed;

(c) From the compressed-air reservoir 4. In this case the valves 44 and 45 are open, 47 and 51 are partially open while 43, 49 and 53 are closed. This makes possible the reaching of the desired temperature which must remain constant; in the test section in spite of the temperature decrease which results from expansion.

The air which is admitted to the second wind tunnel can be derived:

(a) From the atmosphere through the air-intake 52, passing through the heater 42, the valves 53 and 43 being open and the valves 45 and 51 being closed;

(b) From the compressed air reservoir 4. In this case the valve 53 is closed and one of the valves 45 or 51 is open, according to whether or not it is desired to pass compressed air through the heater 42.

By means of different adjustments of the control members, that is to say the valves 43, 44, 45, 47, 49, 51, 53 and the butterfly valve 13, and also by opening the needle valves 20 and 37 to varying degrees, it is possible to obtain in the testing chamber 1 a variation of the pressure and of the temperature, that is to say a variation of the Reynold's number, independently of the Mach number existing in this chamber.

It will be understood that the forms of construction which have just been described may be modified, in particular by the substitution of equivalent means, without thereby departing from the spirit or the scope of the invention.

What I claim is:

1. A wind tunnel comprising a test chamber, an ejector located in the downstream side of said test chamber, and comprising a nozzle which forms part of said test chamber and an annular chamber surrounding said chamber with an inlet introduction conduit connected to said annular chamber, a return circuit connecting the downstream side of said ejector to the upstream side of said test chamber, said return circuit being provided with a discharge nozzle by means of which said fluid may be evacuated, a pump arranged at said discharge nozzle for sucking the fluid from said wind tunnel through said discharge nozzle, means for regulating said pump whereby the quantity of fluid sucked by said pump during the steady state of the wind tunnel is substantially equal to the quantity of fluid introduced into the wind tunnel through said ejector.

2. A wind tunnel in accordance with claim 1, in which said pump is of the hot water type.

3. A wind tunnel in accordance with claim 2, wherein the fluid introduced through said ejector is compressed air.

4. A wind tunnel in accordance with claim 2, wherein the fluid introduced by said ejector is atmospheric air, the total air-driving power being produced by said pump of the hot water type.

5. A wind tunnel in accordnace with claim 4, further comprising a dryer upstream of said inlet introduction conduit, the atmospheric air being previously passed through said dryer.

6. A wind tunnel in accordance with claim 1 additionally comprising a conduit arranged in said return circuit on the upstream side of said pump and providing a means for the evacuation of the combustion gases or the like produced by combustion tests in said test chamber of the wind tunnel.

References Cited in the file of this patent

FOREIGN PATENTS

| | | |
|---|---|---|
| 635,609 | Great Britain | Apr. 12, 1950 |
| 707,159 | Great Britain | Apr. 14, 1954 |
| 769,373 | Great Britain | Mar. 6, 1957 |